United States Patent [19]
Hickling

[11] 3,828,289
[45] Aug. 6, 1974

[54] COMBINED CURRENT AND TEMPERATURE SENSITIVE FUSE ASSEMBLY

[75] Inventor: Colin D. Hickling, Woodstock, N.Y.

[73] Assignee: American Thermostat Corporation, South Cairo, N.Y.

[22] Filed: July 23, 1973

[21] Appl. No.: 381,893

[52] U.S. Cl............................ 337/5, 337/6, 337/143, 337/144, 337/412
[51] Int. Cl. ............................................ H01h 85/00
[58] Field of Search......... 337/5, 6, 12, 13, 15, 161, 337/222, 412, 143, 144; 219/517

[56] References Cited
UNITED STATES PATENTS
| | | | |
|---|---|---|---|
| 3,541,488 | 11/1970 | Odson | 337/112 X |
| 3,599,135 | 8/1971 | Gryctko | 337/6 |
| 3,614,697 | 10/1971 | Dunham | 337/6 X |

Primary Examiner—J. D. Miller
Assistant Examiner—Fred E. Bell

[57] ABSTRACT

A combined current and temperature sensitive fuse assembly of a given current and temperature rating for installation between an electric source and an electric load comprises a pair of electrical paths in parallel, each electrical path having in series a fuse rated for half of the fuse assembly current rating and one of the electrical paths having a mechanical switch in series for interrupting the current flow through the one electrical path. Heat sensitive means, such as a bimetallic element, control the status of the switch in response to fluctuations in temperaure relative to the fuse assembly temperature rating, so that an excessive rise in temperature will cause the heat sensitive means to open the switch and thus cause the total current flow to pass through the other electrical path, thereby blowing its fuse. Upon subsequent lowering of the ambient temperature, the switch is closed so that the total current now flows through the one electrical path and blows its fuse, thus completely isolating the electric load from the electric source.

8 Claims, 1 Drawing Figure

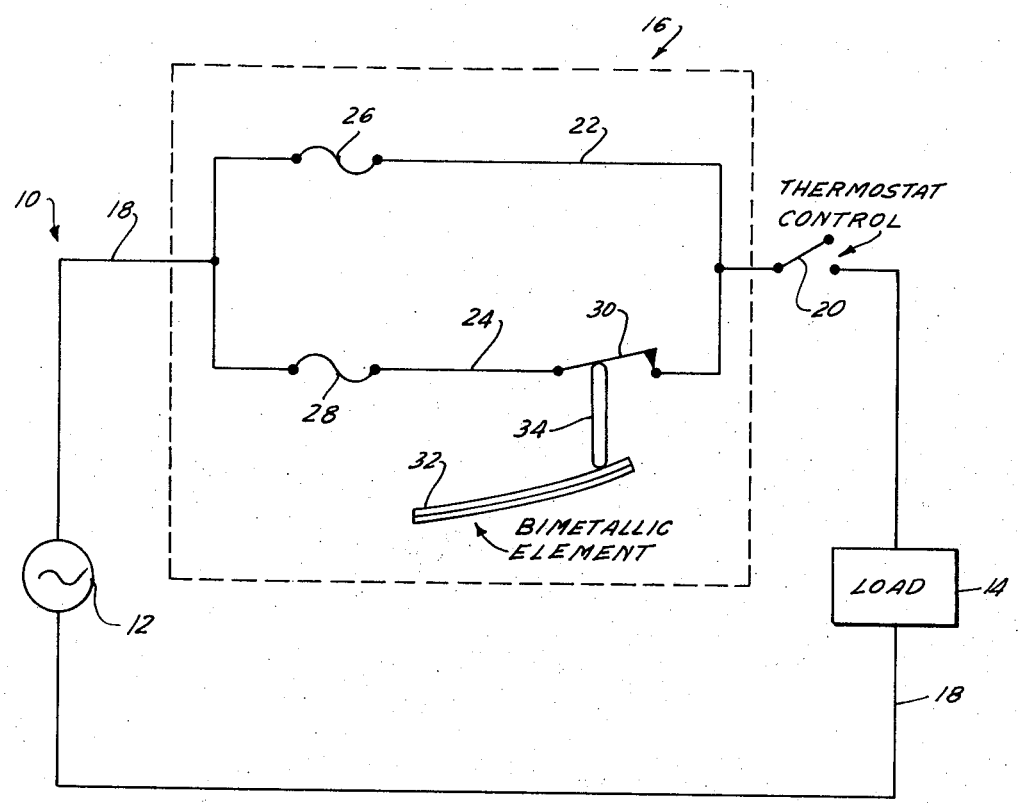

COMBINED CURRENT AND TEMPERATURE SENSITIVE FUSE ASSEMBLY

BACKGROUND OF THE INVENTION

The provision of fuses, such as fusible elements and circuit breakers, in series between an electric supply and an electric load to protect the electric load from excessive electrical currents is well known in the art. The electric load to be protected may be anything from a small household appliance to an entire electrical power station. As the term is used herein, the term "fuse" includes any means for automatically interrupting the current flow through an electrical path when the current flow exceeds a predetermined value and encompasses resettable circuit breaker fuses as well as the older flusible-element fuses requiring replacement. Fuses of this conventional type are considered current-responsive as they are intended to be actuated — that is, blown or tripped — primarily by the heat generated from the current flow therethrough rather than the heat of the ambient surroundings.

Temperature dependent fuses are also well known in the art and are essentially responsive not to the current flow therethrough, but to the ambient temperature in a given location. Since current actually flows through the temperature sensitive element of such a fuse, technical limitations have prevented the developement of a reliable fuse operable at temperatures in excess of 300° F.

A third type of fuse combines the current sensing capabilities of a conventional fuse with the temperature sensing capabilities of a temperature dependent fuse. A temperature sensing element, typically a bimetallic strip, is used to connect a direct short circuit through the conventional fuse to the power supply line whenever the ambient temperature exceeds a pre-selected level, thereby creating a short circuit which causes the conventional fuse to blow and so isolates the electric load from the electric supply. Such prior art combination devices have not been found to perform entirely satisfactorily as the direct connection of the electric power supply to the conventional fuse in response to an ambient temperature surge results in the generation of a large input current surge. Even the virtually instantaneous application of such an extremely high current surge may negatively impact both the appliance load at one end of the line and the fuses at the other end of the line; delicate circuitry in the appliance may be burned-out and unnecessary tripping or blowing of upstream fuses may cause unnecessary electrical shutdowns.

An additional source of discontent with the available combination devices is the continuation of the 300° F ambient temperature limitation, since there are various industries where normal operating temperatures are considerably in excess of 300° F. Still another source of dissatisfaction with the available combination device has been that it requires accessibility to both lines of a two-wire system (in order to effect short circuiting of the fuse in response to an ambient temperature surge), thus complicating installation of a device in instances where only one of the two wires is readily accessible.

While combination devices are useful in any appliances such as computers which must be protected from both current and temperature surges, they have been found to be especially useful in appliances containing circuits having thermostat contacts for temperature control. Such circuits typically involve the use of voltages which cause arcing between the thermostat contacts as they are repeatedly opened and closed over a period of time. A particularly dangerous result of such arcing is the formation of pitting and the eventual welding together of the thermostat contacts so that the temperature continues to rise until catastrophic events, such as melting of the appliance, occur.

Accordingly, an object of the present invention is to provide a fuse assembly which combines the operation of a conventional current-sensitive fuse and an ambient temperature-sensitive fuse and functions in a manner which does not place any electrical stress either upon the source of supply, such as upstream main breakers, or fuses, or upon the load, such as the household appliance, computer system, or thermostatic control.

Another object is to provide such a combined current and temperature sensitive fuse assembly which is operable at ambient temperatures in excess of 300° F.

A further object is to provide such a fuse assembly which requires connection to only one wire of a two-wire circuit.

It is also an object of the present invention to provide such a fuse assembly which is easy to employ, is durable in operation, and yet is relatively inexpensive to manufacture.

It is a further object to provide a method of accomplishing all of the above by utilizing a fuse assembly of the present invention.

SUMMARY OF THE INVENTION

It has been found that the foregoing and related objects can be readily attained in a combined current and temperature sensitive fuse assembly of a given current and temperature rating for installation between an electric source and an electric load comprising a plurality of electric paths in parallel, each of the electrical paths containing means for interrupting the current flow therethrough when the current flow therethrough exceeds a predetermined fraction of the current rating for the fuse assembly. Mechanical switch means are provided in series with at least one and less than all of the electrical paths, the switch means being movable between an operative position permitting current flow therethrough and an inoperative position interrupting current flow therethrough. Heat sensitive means control the movement of the switch means in response to fluctuations in the ambient temperature relative to the temperature rating for the fuse assembly so that a fluctuation of the ambient temperature above the temperature rating for the fuse assembly will cause the heat sensitive means to move the switch means to the inoperative position. This action breaks at least one electrical path and causes the total current flow to pass through the remainder of the electrical paths, whereupon their interrupting means interrupt current flow therethrough to terminate current flow between the source and load. A subsequent lowering of the ambient temperature (such as might occur if the ambient temperature increase had been caused by overheating of the now deactivated load) permits movement of the switch means to the operative position, thereby causing the total current flow to pass through the aforementioned at least one electrical path, whereupon its interrupting means interrupts current flow therethrough to terminate current flow between the source and the load. This results in a complete isolation of the load from the source regardless of subsequent temperature fluctuations until the fuse assembly is reset.

In one embodiment there is provided only a pair of electrical paths in parallel, in which case the interrupting means are actuable when the current flow therethrough exceeds substantially one half the current rating for the fuse assembly and the switch means is in series with only one of the electrical paths.

In a preferred embodiment the heat sensitive means is a bimetallic element adapted to assume first and second positions in response to fluctuations in the ambient temperature, the first position being assumed in response to an increase in ambient temperature and causing the switch means to move to the inoperative or open-circuit position. The switch means comprises a pair of electrical contacts biased towards the operative or closed-circuit position, and the interrupting means are conventional fuses having fusible elements.

A method for protecting an electrical circuit from currents and temperatures in excess of the rated current and temperature of a fuse assembly comprises the steps of providing a plurality of electrical paths in parallel between an electric source and an electric load and sensing the current flow in each of the electrical paths as well as the ambient temperature. The current flow is interrupted in each of the electrical paths wherein the current flow therethrough exceeds a predetermined fraction of the rated current of the fuse assembly. Moreover, the current flow in at least one and less than all of the electric paths is interrupted during any period of time that the ambient temperature exceeds by a predetermined value the rated temperature of the fuse assembly, whereby the total current flow is directed through the remainder of the electrical paths blowing the fuses therein. Finally, current flow in at least the aforementioned one electrical path is permitted once the ambient temperature has dropped to a predetermined value, whereby the total current flow is directed through the aforementioned at least one electrical path, blowing the fuse in that path.

Preferably the ambient temperature is sensed by a bimetallic element adapted to open and close switch contacts in series with the aforementioned at least one electrical path, and the current flow in each of the electrical paths is sensed by means for interrupting the current flow in each of the electrical paths.

BRIEF DESCRIPTION OF THE DRAWING

FIG. 1 is a schematic view of a circuit embodying the novel fuse assembly of the present invention.

DETAILED DESCRIPTION OF THE ILLUSTRATED EMBODIMENT

With reference now to the drawing, therein illustrated is an electrical circuit generally designated by the numeral 10 comprising a conventional electric supply 12 such as a 120 volt, 60 cycle electric outlet, a conventional electric load 14 such as an electric iron with thermostat control, the novel fuse assembly generally designated by the numeral 16, and lengths of wire 18 connecting the various elements in series. As the fuse assembly 16 finds a special utility in connection with loads 14 having thermostatic controls associated therewith, the thermostatic control physically disposed within the electrical iron 14 is shown separately as a thermostatically controlled switch 20 between the fuse assembly 16 and the iron 14.

The fuse assembly, generally designated by the numeral 16 and represented in the drawing as enclosed by a dotted rectangle, comprises a pair of electrical paths 22, 24 effectively connecting the electric supply 12 and the load 14 (through thermostatic control switch 20). In series with the electrical paths 22, 24 are conventional current-responsive fuses 26, 28, respectively, each designated to have a current rating of approximately one half the current rating for the fuse assembly 16. In series with fuse 28 along electrical path 24 is a mechanical current-bearing switch 30. The switch 30 is movable between an operative or closed-circuit position permitting current flow therethrough and an inoperative or open-circuit position interrupting current flow therethrough, the switch as illustrated being biased toward the operative position wherein the contacts of the switch are electrically connected.

As part of the fuse assembly 16, a heat sensitive bimetallic strip 32 of conventional design for thermostatic control flexes back and forth in response to fluctuations in the ambient temperature and acts through an electrically insulated push rod 34 to control the movement of the switch 30 between its operative and inoperative positions; that is, by opening and closing the switch. The bimetallic element 32 is adapted to assume first and second positions in response to such fluctuations in the ambient temperature, the first position being assumed in response to higher ambient temperature than the second position and causing the switch 30 to move to its inoperative or open position.

For the purposes of illustrating the operation of the fuse assembly 16 in connection with circuit 10, it will be assumed that the electrical supply 12 is a 120 volt 60 cycle outlet and the load 14 is an electrical iron with a heating element of 1,000 watts capacity, so that the normal current through the wires 18 will be 8.3 amperes. Accordingly, the fuse assembly 16 located within the iron 14 has a current rating of 10 amperes, which means that each of the fuses 26, 28 has fuse current ratings of 5 amperes apiece due to the configuration of electrical paths 22, 24 in parallel. Should a short circuit suddenly develop in iron 14 with a sharp surge of current flowing through the wires 18, the divided current passing through fuses 26, 28 would exceed 5 amperes and the fuses would blow, thereby disconnecting the iron 14 from the outlet 12. On the other hand, should the thermostatic control switch 20 become locked in a closed position, the iron 14 would rapidly overheat with an accompanying increase in the ambient temperature in the vicinity of the iron 14 and hence the bimetallic element 32. Since the fuses 26, 28 are current-sensitive devices only, they are not actuated by, and thus cannot remedy such an excessive rise in temperature. However, under the influence of the increased ambient temperature, the bimetallic element 32 will flex further upwards, as shown in the drawing, to force the push rod 34 to open the contacts of mechanical switch 30 in electrical path 24 when the ambient temperature exceeds the temperature rating for the fuse assembly 16 by a predetermined value.

Movement of switch 30 to the open or inoperative position incapacitates electrical path 24 so that the total current flow of 8.3 amperes is applied across the 5 ampere fuse 26, which blows virtually instantaneously. As the iron 14 is thus temporarily disconnected from the electrical supply 12, the iron 14 will start to cool and the ambient temperature will eventually return to below a predetermined value, thus unflexing bimetallic element 32, releasing pressure on the push rod 34 and permitting movement of the switch 30 to its operative or closed position in response to the built-in bias of the switch. Upon closure of the switch 30, the iron 14 is again connected to the outlet 12, but the application of the total current flow of 8.3 amperes through 5 ampere fuse 28 will now cause that fuse to blow virtually instantaneously, thereby completely disconnecting iron 14 from outlet 12 regardless of subsequent temperature fluctuations until the fuses 26, 28 are replaced or reset.

It will be noted that at no point during the aforementioned operation of the fuse assembly was the line current permitted to exceed the rated current for the fuse assembly so that there is no possibility of harm to the load from a momentary current surge and likelihood of blowing upstream fuses is minimized to localize the effect of the disruption in service as much as possible. Bimetallic strips suitable for use as the bimetallic element are widely available and may be selected to provide for actuation and de-actuation of the mechanical switch over a wide variety fo temperatures extending from at least room temperature to at least 2,000° F. The assembly may be located anywhere between the source and the load where it can sense the ambient temperature in question and requires connection with only one of the line wires for the purpose of installation.

Obviously three or more separate electrical paths could be utilized for the fuse assembly, with the fuse in each electrical path being designed to interrupt any current flow therethrough exceeding a predetermined value of the fuse assembly current rating and the switch means provided in any number of the electrical paths of the fuse assembly less than the total number of paths.

Now that one embodiment of the present invention has been shown and described in detail, modifications and variations thereof will become readily apparent to those skilled in the art. For example, heat-sensitive means other than a bimetallic metal strip may be utilized for controlling the action of the mechanical switch, including by way of illustration an electrical or thermoelectrical temperature sensing device operating a mechanical solenoidoperated switch. Also, the heat sensitive means may be rigidly connected to an unbiased mechanical switch, either directly or through an intermediate member, to open and close the switch directly. Accordingly, the spirit and scope of the present invention are intended to be limited not by the foregoing disclosure, but by the appended claims.

I claim:

1. A combined current and temperature sensitive fuse assembly of given current and temperature rating for installation between an electric source and an electric load comprising
   a. a plurality of electrical paths in parallel, each of said electrical paths containing means for interrupting the current flow therethrough when the current flow therethrough exceeds a predetermined fraction of the current rating for the fuse assembly;
   b. mechanical switch means in series with at least one and less than all of said electrical paths and movable between an operative position permitting current flow therethrough and an inoperative position interrupting current flow therethrough; and
   c. heat-sensitive means for controlling the movement of said switch means in response to fluctuations in the ambient temperature relative to the temperature rating for the fuse assembly;
   whereby a fluctuation of the ambient temperature above the temperature rating for the fuse assembly will cause said heat-sensitive means to move said switch means to said inoperative position, thereby breaking said at least one electrical path and causing the total current flow to pass through the remainder of said electrical paths, whereupon said interrupting means thereof interrupts current flow therethrough to terminate current flow between the source and load;
   and whereby a subsequent lowering of the ambient temperature permits movement of said switch means to said operative position, thereby causing the total current flow to pass through said at least one electrical path, whereupon said interrupting means thereof interrupts current flow therethrough to terminate current flow between the source and load.

2. The fuse assembly of claim 1 wherein said heat-sensitive means is a bimetallic element.

3. The fuse assembly of claim 1 wherein said switch means is biased towards said operative position.

4. The fuse assembly of claim 3 wherein said heat-sensitive means is a bimetallic element adapted to assume first and second positions in response to fluctuations in ambient temperature, said first position being assumed in response to higher ambient temperatures than said second position and causing said switch means to move to said inoperative position.

5. The fuse assembly of claim 1 wherein said interrupting means comprises fusible elements, and said switch means comprises a pair of electrical contacts.

6. The fuse assembly of claim 1 wherein there is only a pair of said electrical paths in parallel, said interrupting means are actuable when the current flow therethrough substantially exceeds one-half the current rating for the fuse assembly, and said switch means is in series with only one of said electrical paths.

7. A method for protecting an electrical circuit from currents and ambient temperatures in excess of a predetermined current and ambient temperature comprising the steps of:
   A. providing in series with an electrical circuit a plurality of electrical paths in parallel;
   B. sensing the current flow in each of said electrical paths;
   C. sensing the ambient temperature;
   D. interrupting the current flow in each of said electrical paths wherein the current flow therethrough exceeds a given fraction of the predetermined current; and
   E. temporarily interrupting the current flow in at least one and less than all of said electrical paths during any period of time that the ambient temperature exceeds by a given value the predetermined temperature, whereby the total current flow is directed through the remainder of said electrical paths, and permitting the resumption of the current flow in said at least one electrical path subsequent thereto when the ambient temperature has dropped to a predetermined value, whereby the total current flow is directed through said at least one electrical path.

8. The method of claim 7 wherein the ambient temperature is sensed by bimetallic element means adapted to open and close switch contacts in series with said at least one electric path, and wherein the current flow in each of said electric paths is sensed by means for interrupting the current flow in each of said electric paths.

* * * * *